United States Patent [19]
Baudin

[11] Patent Number: 5,935,620
[45] Date of Patent: Aug. 10, 1999

[54] BLOW MOLD HAVING SLOTS TO ALLOW AIR TO ESCAPE

[75] Inventor: Gilles Baudin, Domont, France

[73] Assignee: L'Oreal, Paris, France

[21] Appl. No.: 08/984,125

[22] Filed: Dec. 3, 1997

[30] Foreign Application Priority Data

Dec. 4, 1996 [FR] France .................................. 96 14881

[51] Int. Cl.⁶ ........................... B29C 33/10; B29C 49/62
[52] U.S. Cl. ........................................ 425/522; 425/812
[58] Field of Search ..................... 425/812, 522

[56] References Cited

U.S. PATENT DOCUMENTS

| | | | |
|---|---|---|---|
| 2,924,851 | 1/1960 | Birckhead, Jr. et al. | 425/812 |
| 3,354,509 | 11/1967 | Ammondson | 425/812 |
| 4,120,635 | 10/1978 | Langecker | 425/522 |
| 4,151,976 | 5/1979 | Schurman | 425/522 |
| 4,909,972 | 3/1990 | Britz | 425/812 |
| 5,217,729 | 6/1993 | Terauchi et al. | 425/522 |
| 5,411,699 | 5/1995 | Collette et al. | 425/522 |

FOREIGN PATENT DOCUMENTS

| | | | |
|---|---|---|---|
| 0 435 446 A2 | 7/1991 | European Pat. Off. . | |
| 1454947 | 3/1971 | Germany | 425/522 |
| 4-336224 | 11/1992 | Japan | 425/812 |
| 4-345825 | 12/1992 | Japan | 425/522 |
| 7-205267 | 8/1995 | Japan . | |
| 2 292 905 | 3/1996 | United Kingdom . | |

OTHER PUBLICATIONS

Plastverarbeiter, vol. 35, No. 7, Jul., 1984, pp. 102–103, Bericht Von Der Tagung Der VDI–K in Bamberg, "Entwicklungsschwerpunkt Blaswerkzeug".

Otto Plajer, "Werkzeuge Fur Das Blasformen", 1968, Zechner & Huthig Verlag GmbH, pp. 161–165.

Blow Molding Handbook, D. V. Rosato, 1989, Hanser Publishers, pp. 282–289.

*Primary Examiner*—Robert Davis
*Attorney, Agent, or Firm*—Oblon, Spivak, McClelland, Maier & Neustadt, P.C.

[57] ABSTRACT

The present invention concerns a molding device with a longitudinal axis, comprising a first half-shell and a second half-shell, the two half-shells being capable of being joined along an opening plane so as to form a cavity with an elongate cross-section, having a major axis and a minor axis. The opening plane of the mold is substantially perpendicular to the major axis. In accordance with the invention, each half-shell comprises at least two separate longitudinal parts joined along at least one joint surface, each joint surface being delimited by two opposed sides of two adjacent parts, at least one of the sides having at least one recess so as to define with the other side at least one narrow slot to allow air to escape along the surface during the blow molding of the object.

21 Claims, 4 Drawing Sheets

BLOW MOLD HAVING SLOTS TO ALLOW AIR TO ESCAPE

BACKGROUND OF THE INVENTION

Field of the Invention

The present invention relates to a moulding device, and to a method for manufacturing thermoplastic containers or objects of an elongate shape, having a major axis and a minor axis. The invention is particularly suitable for manufacturing bottles with a cross-section that is substantially elliptical, rectangular or oval, of the type having a body of which one end has a transverse bottom, the other end ending in a neck joined to the body of the bottle by a shoulder, and on which neck a stopper is mounted to close the bottle in a detachable manner. The method can also be used for the manufacture of tube-shaped containers.

Such containers are used in particular for the packaging of products of a liquid-to-pasty consistency, such as used in the field of cosmetics, pharmacy, the parapharmaceutical field, or in the field of the agricultural/food industry.

During the last few years, the bottle-manufacturing sector has witnessed a massive development of containers whose cross-section is of an elongate shape, this mainly for reasons of marketing, an aesthetic appearance, size, or for being held in the hand.

Typically, such containers are generally obtained by blow moulding a tubular blank obtained by extrusion or injection moulding, or in the case of a two-material container, by co-extrusion or duplex injection moulding.

According to the extrusion technique for example, the plastic materials are heated and pressurized by means of a screw-sleeve assembly so as to provide a tubular blank, in the form of a hot parison, by means of an extrusion head. This tubular blank is subsequently taken between two half-moulds which have the inverse shape of the desired container, and the blow moulding allows the shaping of a parison which stretches under the pressure and assumes the shape of the mould. Cooling allows the material to become fixed in the shape thus obtained.

In the case of injection moulding, a preform is made in an intermediate mould whose shape is adapted to the shape of the container to be made. The preform is cooled without blow moulding the material. Subsequently, with a view to obtaining the container in its final shape, it is introduced at the appropriate temperature (typically around 80° C.) into a mould, wherein it is blown so as to give it the final shape of the container.

Conventionally, the mould is arranged in such a way that the joint plane (the plane along which the two half-shells of the mould are joined) is in the median plane passing through the major axis of the bottle. This solution makes it possible to facilitate the removal from the mould. A major drawback of this solution lies in the fact that for a mould of given dimensions, it is only possible to have a relatively limited number of cavities available, so that relatively few bottles can be made simultaneously.

GB-A-2 292 905 describes a method for blow moulding bottles made of a plastic material in a mould whose cross section is of an elongate shape. The mould has two half-shells forming a cavity of a shape complementary to the shape of the bottle. The half-shells are joined along a joint plane situated in the median plane passing through the minor axis of the bottle. On the bottle thus obtained, the joint lines are situated on the large sides of the bottle. As mentioned in this document, these joint lines can be masked in the final product by placing a label on one or the other, or even on both, of the large sides.

This document gives prominence to the fact that more bottles can be moulded at the same time. Thus the productivity of the equipment is substantially increased and, although the mould is more expensive, the difference is quickly compensated by the substantial gain in productivity.

One of the critical parameters of the blow moulding is linked to the problem of the vents in the mould which must makes it possible to remove out of the mould the air trapped between the material and the mould sides. GB-A-2 292 905 is completely silent on this subject. These vents are, however, indispensable for permitting the blow moulding of the container in good conditions. In the Précis de matières plastiques, [Manual of Plastic Materials] 5th Edition, published by NATHAN, page 135, it is mentioned that the mould must be provided with a very efficient system of vents, to ensure that the blow moulding of the objects is easy. If the holes are too small (smaller than 0.1 mm) the evacuation of the air is unsatisfactory. If the holes are too large (a diameter of 0.3 mm), they mark the surface of the object and affect the aesthetic appearance of the final product. Slots arranged in the joint plane, with a thickness of 0.1 mm and a width of 25 mm, or 0.03 mm over a width of 5 mm are mentioned as giving good results. In the other parts of the mould, it is recommended to cut a cylindrical hole and to stopper it with a hexagon. The air can thus pass between the faces of the hexagon and the internal sides of the hole.

Such a configuration is completely satisfactory for moulds whose distance between the longitudinal axis of the mould and the sides of the mould is substantially the same at all points of the mould. This is in particular the case of an object whose cross-section is that of a cylinder of revolution, i.e. a body of revolution of a rectilinear generator line about a closed path (not necessarily a circle). Indeed in this configuration, the material comes into contact substantially simultaneously at all points of the mould.

For an object of an elongate shape, and in particular for a container of an elliptical shape for example, the material comes into contact at first on the sides of the mould situated on the minor axis, and then secondly on the sides of the mould situated on the major axis. Thus by making a hole centered on the major axis, and then by plugging it with a hexagonal element, the air escape will be distinctly inadequate in the region of the major axis of the mould, because of the presence of the hexagon which is also centered on the axis. Offsetting the hole in relation to the axis is not satisfactory from the point of view of the resulting aesthetic aspect. Moreover, such vents are subject to rapid clogging. The operation of cleaning these vents is lengthy, and expensive in terms of machine time. Similarly, the making of slot lines on the major axis of the mould by cutting the wall of the mould is an unduly complex and unduly expensive operation, because of the dimensions which such slots must have. Their maintenance would also be very tricky.

Another solution of these problems of the air escape lies in using a mould made of a porous material, whose structure permits an air escape at every point of the mould. This solution, although attractive, has the drawback of being expensive. Moreover there occurs fast clogging of the pores of the mould, because of the material particles or dust carried by the air during the blow moulding.

Another less expensive solution would lie in making small holes, of a circular cross-section for example, in the side of the mould and filling them with a piece of porous material with a cross-section identical to that of the holes, so as to obturate the hole almost completely. The air could thus escape through the pores of the material of the filler piece. Such a solution, although it would contribute to substantially improving the air escape opposite the major axis of the mould, would however, have the same problems of clogging as those set out above with reference to the porous mould. Indeed, the air escape would very quickly become insufficient, and even completely ineffective.

GB-A-989 179 describes, with reference to its FIG. 9, a method for moulding a bottle with an elongate cross-section wherein the joint plane is orientated perpendicularly to the major axis of the bottle, that is to say, in the median plane of the bottle passing through the minor axis of the bottle. Such a configuration of the moulding is also suggested in GB-A-935 183. These documents are also completely silent regarding the problem of the vents necessary for the blow moulding.

Thus this problem does not, to date, have a really satisfactory solution.

Thus it is one of the objects of the present invention to provide a method for blow moulding a container with an elongate cross-section in a mould that does not have the above mentioned drawbacks with reference to the known devices of the prior art.

It is, in particular, an object of the present invention to provide a solution which is simple, economical, efficient, and durable in the course of time, to solve the problem of the air escape during the blow moulding of a container of an elongate shape in a mould.

Yet another object of the invention is to enable the operation of a mould allowing the blow moulding in accordance with the invention.

Other objects of the invention will become apparent in detail in the description that follows.

The Applicant has surprisingly discovered that the problem could be solved advantageously by making each half-shell in the form of at least two separate parts kept contiguous along at least one joint surface, the surface serving as a support for a system of vents. Thus in each half-shell there is obtained at least one joint surface which intersects the internal surface of the mould substantially at the point (or points) most remote from the longitudinal axis of the mould.

According to one embodiment a "pseudo" joint plane is obtained perpendicularly to the opening plane of the mould, and its sole function is to serve as a support for a system of vents in the form of at least one narrow slot. The terms "pseudo" joint plane reflects the fact that it does not define an opening plane in the sense that is usually understood. Thus according to the invention the mould is made in at least four parts and during its use opens only in two parts, the other two parts being kept together and held tightly against one another by appropriate means.

In accordance with a first aspect of the invention these objects are attained by making a blow moulding mould with a longitudinal axis X, comprising a first half-shell and a second half-shell, the two half-shells being capable of being joined with a view to the blow moulding of an object along a first joint plane, so as to form a cavity with an elongate cross-section having a major axis and a minor axis, the first joint plane being substantially perpendicular to the major axis, the half-shells moving away from one another along a direction perpendicular to the joint plane during the removal of the object from the mould, characterized in that each half-shell comprises at least two separate longitudinal parts, joined along at least one joint surface, each joint surface being delimited by two opposed sides of two adjacent parts, and at least one of the sides having at least one recess so as to define with the other side at least one narrow slot to allow air to escape during the blow moulding of the object along the surface.

Advantageously, each half-shell comprises two separate parts whose two respective sides are kept joined along a second joint plane situated on the major axis and perpendicular to the first, at least one of the sides having at least one recess so as to define in each one of the ends of the mould situated on the major axis, at least one narrow slot orientated along the axis X, so as to allow air to escape along the major axis.

A plurality of recesses may be regularly distributed over the height of the mould, the recesses being obtained alternately on one and the other of the sides delimiting the joint surface (or surfaces).

Alternatively, the plurality of recesses is distributed regularly over the height of the mould, the recesses being disposed on only one of the sides delimiting the joint surface (or surfaces).

Advantageously, the two half-shells are joined during the blow moulding on either side of the major axis along two respective sides, at least one of the respective sides having at least one recess so as to define, in each one of the mould ends situated on the minor axis, at least one narrow slot orientated along the axis X so as to permit air to escape along the minor axis.

The slots may have a height along axis X of from 3 mm to 25 mm, and preferably from 5 mm to 15 mm, and a width of from 0.01 mm to 0.1 mm, and preferably from 0.02 mm to 0.06 mm.

The mould may comprise a plurality of cavities, so as to mould a plurality of objects simultaneously, the cavities being disposed so that their major axes are disposed side by side, the minor axes being substantially aligned. A first clamping element may be provided to keep the first half-shells of the plurality of cavities joined together, and a second clamping element is provided to keep the second half-shells of the plurality of cavities joined together, so as to permit a simultaneous removal of the said plurality of objects from the mould.

In accordance with a second aspect of the invention, a method is also obtained for blow moulding in the mould with axis X, a thermoplastic object or a container with an elongate cross-section having a major axis and a minor axis, wherein the container is blow moulded in a mould in accordance with the first aspect of the invention.

The thermoplastic container may be formed of a material such as high density or low density polyethylene, polypropylene, polyethylene terephthalate, polyvinyl chloride, or a combination of such materials.

The container may be of the type comprising a body, one end of which comprises a bottom, and the other end ends in a neck joined to the body by a shoulder. Advantageously, the body of the bottle comprises two convex sides along the major axis, so as to facilitate the removal from the mould.

A plurality of containers can be moulded simultaneously during the same moulding operation, the mould defining a plurality of cavities disposed so that the containers have their major axes disposed side by side, the minor axes being substantially aligned.

A third aspect of the invention also concerns a method for manufacturing a thermoplastic container with an elongate cross-section having a major axis and a minor axis, comprising the following steps:

a) obtaining a tubular blank made of a thermoplastic material;

b) introducing the tubular blank into a blow moulding mould;

c) blow moulding the tubular blank so as to apply the thermoplastic material against the internal sides of the mould; and d) after cooling, removing the container from the mould; characterized in that the blow moulding mould is according to the first aspect of the invention.

The tubular blank is preferably obtained by extrusion.

The invention also aims to obtain a container by the method of the third aspect.

Thus with the mould used in accordance with the present invention, one obtains the blow moulding of containers, which is improved by a proper disposition of the vents. These vents are easy to make because of their position on a "pseudo" joint plane and can be made in the desired dimensions, however small. The service and maintenance of such a mould are also facilitated by the fact that the cleaning of the vents can be effected quite simply by dismantling the corresponding parts of the mould.

BRIEF DESCRIPTION OF THE DRAWINGS

Apart from the arrangements set out above, the invention consists of a certain number of other arrangements which will be discussed in detail below with regard to non-restrictive examples, described with reference to the attached drawings wherein.

DESCRIPTION OF THE PREFERRED EMBODIMENT

FIG. 1, to which reference will now be made, illustrates a view in perspective of an embodiment of a mould in accordance with the present invention. In fact, the mould illustrated is suitable for manufacturing a bottle-type container.

Figure 1A:
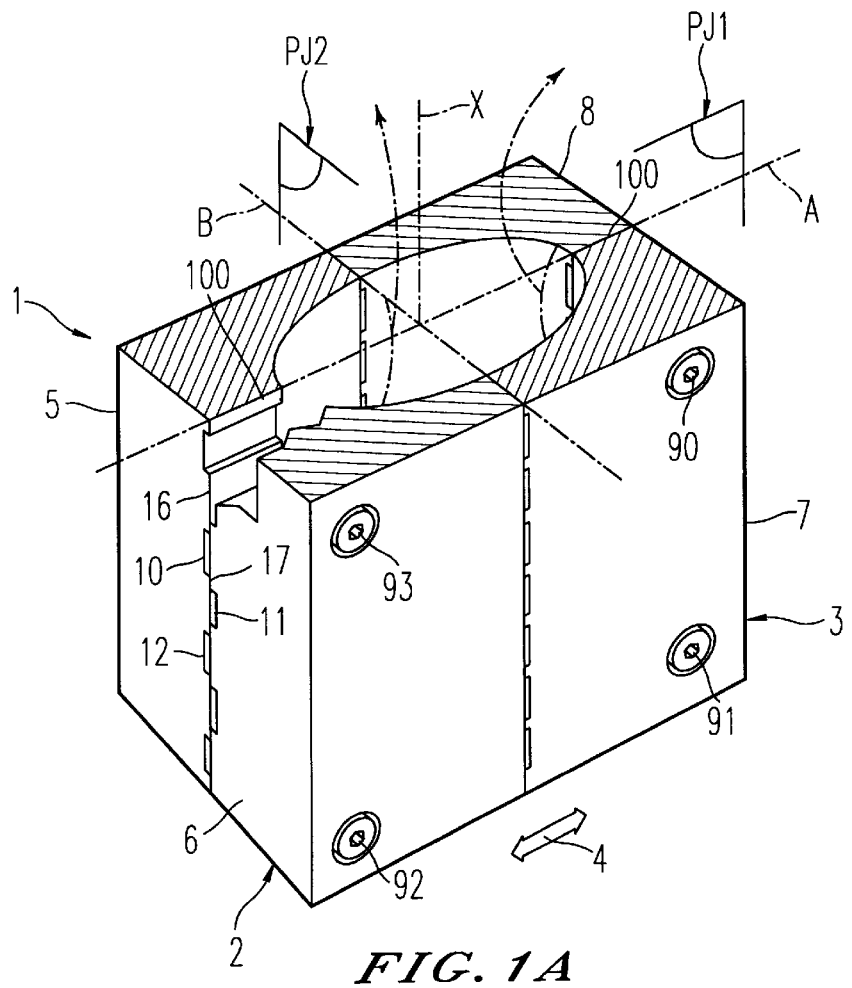
FIGS. 1A–1C schematically illustrate various aspects of a mould that can be used for the operation of the blow moulding process in accordance with the invention.

FIG. 1A shows only that part of the mould which corresponds to the body of the bottle. The mould 1 with a longitudinal axis X comprises, in the main, two half-shells 2 and 3 joined along a joint plane PJ2 corresponding to the median plane passing through the minor axis of the container. The two half-shells are mounted so as to be capable of moving away from one another, parallel to the joint plane PJ2 along a direction perpendicular to the joint plane PJ2, in the direction of arrow 4, to allow the object made to be removed from the mould. The two half-shells thus joined along the joint plane PJ2 define a cavity of a shape complementary to the shape of the object to be made. The cross-section of the cavity is of an elongate shape (elliptical, oval, rectangular etc.) having a major axis A and a minor axis B. In this embodiment, the zone of the mould most remote from the longitudinal axis of the mould is the zone situated substantially on the axis A. Each half-shell 2,3 is formed by two longitudinal parts 5, 6, 7, 8 kept tightly against one another by any appropriate means. In the embodiment illustrated, the parts each forming half-shells are kept joined to one another by means of threaded rods 90, 91, 92, 93 passing through the width of the mould along the axis B. Alternatively, as will be seen in greater detail with reference to FIGS. 3 to 5, the clamping can be obtained by means of a frame in two parts (one for each half-shell) whose function, apart from the clamping, is to contain a cooling circuit for the cooling of the moulded object.

The two parts, each forming half-shells, are joined along a surface portion 100 situated in a "pseudo" joint plane PJ1 which is perpendicular to the opening plane PJ2 and whose main function is to serve as a support for a system of vents 10, 11, 12, making it possible to eject the air contained between the thermoplastic material and the sides of the mould during the blow moulding. The surface portion 100 is situated outside the plane PJ2 (that is to say, in a plane not coinciding with the plane PJ2) and extends in a plane parallel to the axis X. The vents take the form of recesses obtained (for example, by grinding) in one or the other (or in both) of the sides 16, 17 along which the two parts of each half-shell are joined. Thus in the assembled position of the mould these recesses define a plurality of narrow slots 10, 11, 12 in the plane PJ1, and this in each of the ends of the mould along the axis A. Typically, these slots may have a height along the axis X of from 3 mm to 25 mm, and preferably from 5 mm to 15 mm, and a width of from 0.01 mm to 0.1 mm, and preferably from 0.02 mm to 0.06 mm.

Figure 1B:
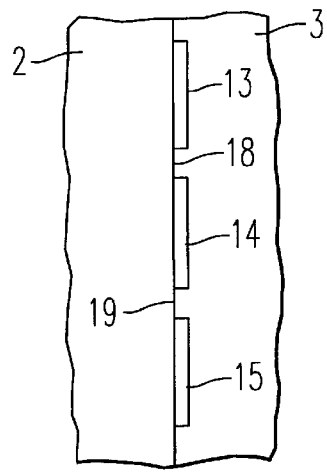

Advantageously, similar recesses are made along the opening joint plane PJ2. As shown in FIG. 1B, these recesses are obtained on the same side 18 of one or the other of the half-shells. According to the embodiment of FIG. 1C, the recesses are obtained alternately on one side 16 and on the other side 17, so as to balance the air escape round the joint plane PJ1 or joint plane PJ2. Alternatively, opposed recesses are made on one and the other of the sides so as to define symmetrical slots relative to PJ1 or PJ2.

Figure 1C:
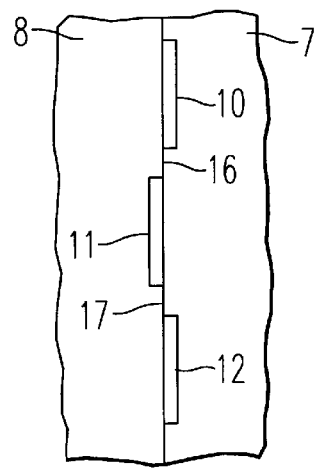
Figure 2A:
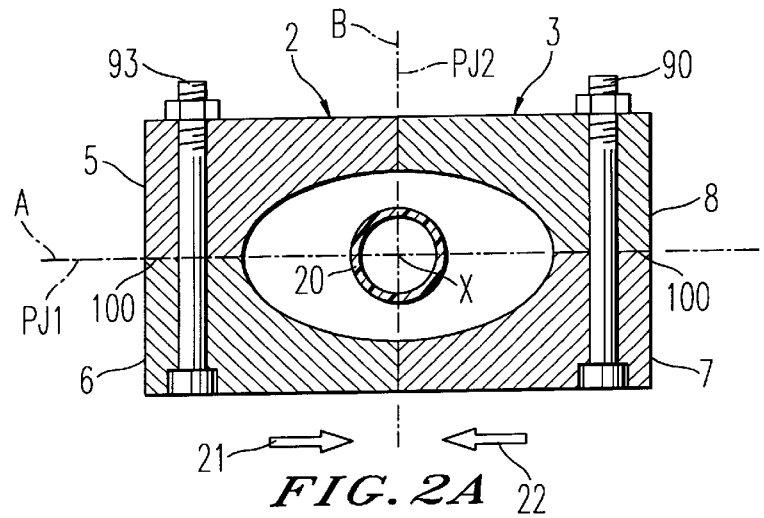
FIGS. 2A–2C illustrate the main steps of a mode of operating the method in accordance with the invention.
Figure 2B:
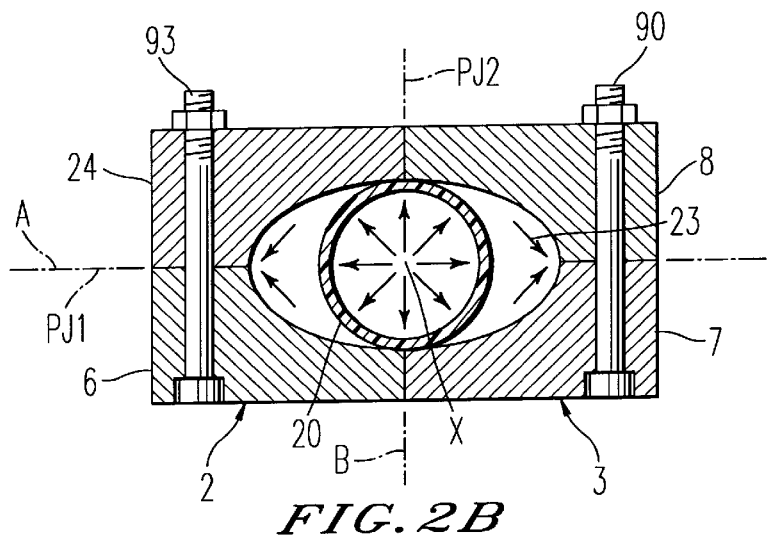
Figure 2C:
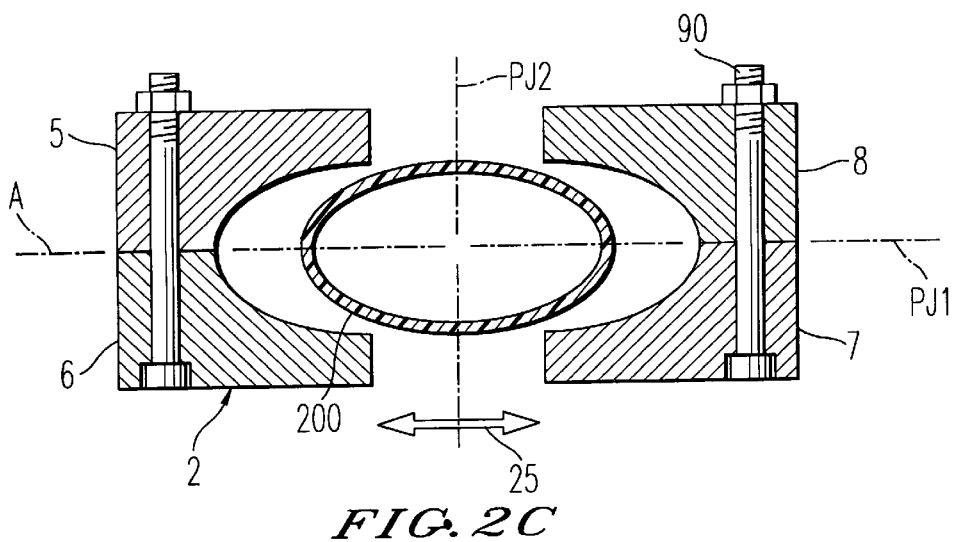

FIGS. 2A–2C, to which reference will now be made, schematically illustrate the main steps of a method for obtaining a container in accordance with the present invention, by means of a mould of the type described with reference to FIGS. 1A–1C.

In FIG. 2A the two half-shells 2, 3 of the mould 1 are closed over a tubular blank 20, with a substantially circular cross-section, along a movement direction perpendicular to the plane PJ2 in the direction of arrows 21, 22. The tubular blank made of a thermoplastic material is obtained in the conventional way by an extrusion or injection moulding process. According to the invention the extrusion technique is preferred, inasmuch as the cost of the equipment is substantially lower than that of the injection moulding technique, and in particular as far as the moulds are concerned. Moreover, it permits a greater variety of object shapes. The extrusion technique offers in particular the possibility of obtaining larger ratios between the diameter of the neck and the width of the body of the bottle. Moreover, it permits the making of multilayer objects which is difficult, and hence extremely rare, in injection moulding.

In FIG. 2B a blow moulding device is introduced inside the mould and of the parison 20, so as to expand the material and to apply it against the sides of the mould. The air contained between the material and the sides of the mould escapes firstly through the vents, if any, arranged on the joint plane PJ2, then through the vents arranged on the joint plane PJ1 in the way indicated by the arrows 23, 24. Thus the material can stick perfectly to the sides of the mould.

In FIG. 2C, after the blow-moulded material has cooled, the half-shells 2, 3 are moved away from one another along a direction perpendicular to the joint plane PJ2, in the direction of the two-way arrow 25, so as to remove the object 200 from the mould.

Figure 6:
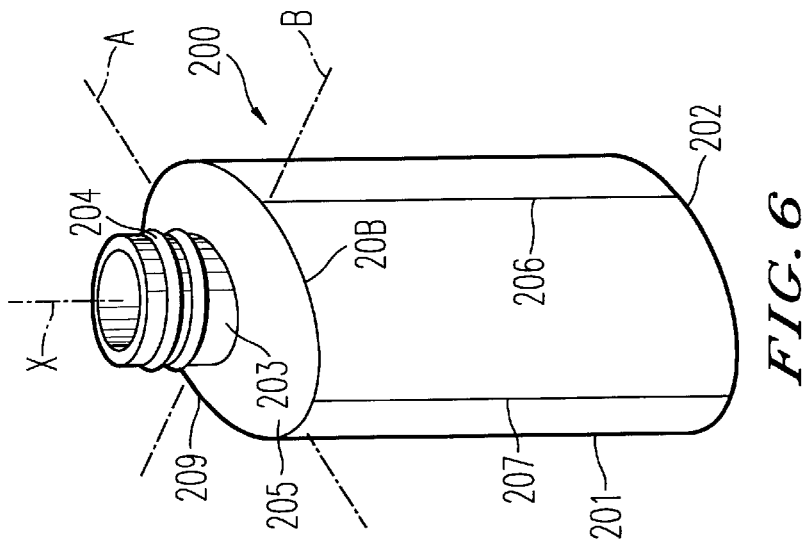
FIG. 6 represents an embodiment of a container obtained in accordance with the invention.

Thus a bottle 200 of the type shown in FIG. 6 is obtained. It takes the form of a body 201 of an elongate shape (elliptical or oval, for example) with a major axis A and a minor axis B. Preferably the larger sides of the bottle have a slightly convex furrowed profile, so as to facilitate the removal from the mould. At one of its ends, the bottle is closed by a bottom 202. The other end is surmounted by a neck 203 carrying a thread capable of cooperating in a detachable manner with a thread 204 of a stopper (not shown). The body 201 is joined to the neck by a shoulder 205. A fine line 206 is visible, substantially at the center of each of the large sides 208, 209 of the bottle 200. This line corresponds to the joint line of the two half-shells of the mould, along the joint plane PJ2. This line is hardly perceptible and may be masked by any appropriate means, for example by means of a label. On the small sides of the bottle there may be distinguished a broken line, corresponding to the line of the vents along the joint plane PJ1. This line is also hardly visible. In any case, none of these lines, continuous or broken, affects the aesthetic appearance of the product to any substantial extent.

Figure 3:
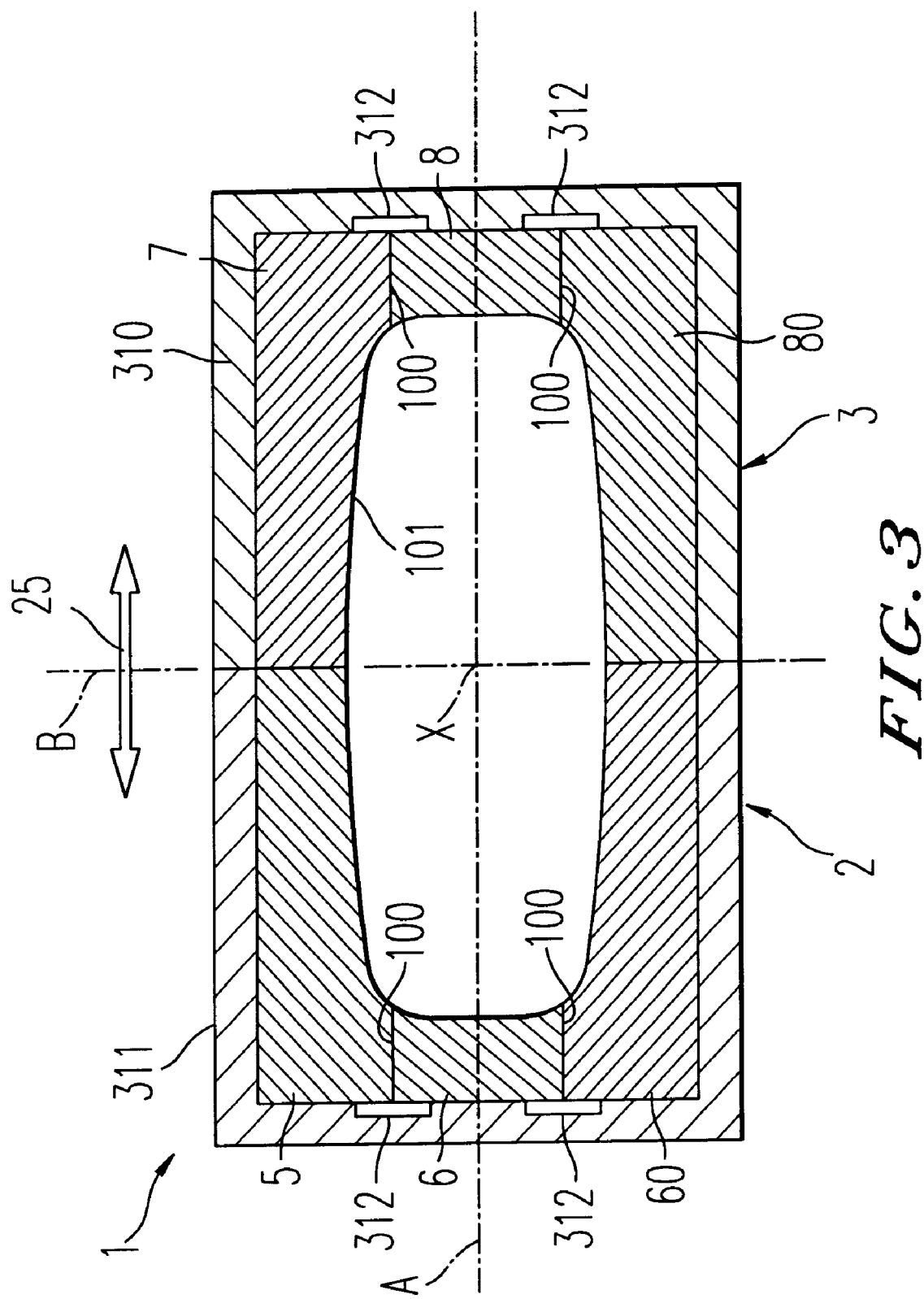
FIG. 3 illustrates another embodiment of a mould in accordance with the invention.

In the embodiment of FIG. 3, the cavity 101 of the mould 1 has a substantially rectangular cross-section. In the same way as for the mould of FIGS. 1A–1C, the mould is formed by two half-shells 2, 3 capable of being joined, with a view to the blow moulding of an object, along a joint plane PJ2 corresponding to the median plane passing through the minor axis B. Each one of the half-shells 2, 3 is formed by three parts 5, 6, 60; 7, 8, 80, respectively, kept clamped inside a frame of two parts 310, 311. With such a configuration, the zones of the mould most remote from the longitudinal axis X are those situated substanstially opposite the corners of the rectangle formed by the cross-section of the cavity. Thus the joint surface 100 between the part 7 and the part 8 intersects the internal side of the mould in the vicinity of one of the corners of the rectangle. The same applies to the joint surfaces 100 between the parts 8 and 80, 5 and 6 and 6 and 60. Advantageously, these joint surfaces are orientated parallel to the axis A, so as to simplify the making of the mould. Each of the joint surfaces 100 has vents arranged identically with those of the mould of FIGS. 1A–1C. To remove the container from the mould, each of the half-shells are moved away, parallel to the plane PJ2, along a direction perpendicular to the plane PJ2. The half-frames 310, 311 have, opposite each of the joint surfaces 100, a recess extending substantially over the whole height of the mould, so as to permit the evacuation of the air driven into the vents.

Figure 4:
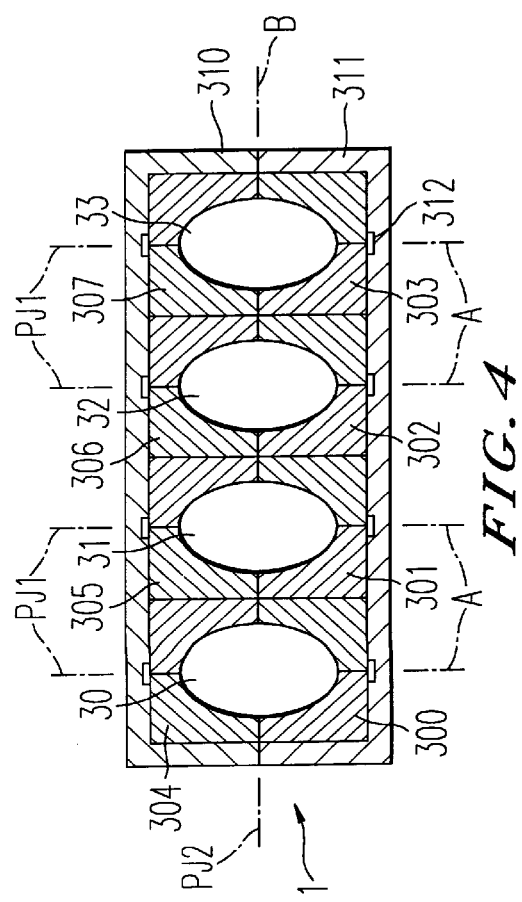
FIGS. 4 and 5 illustrate another embodiment of a mould comprising a plurality of cavities.
Figure 5:
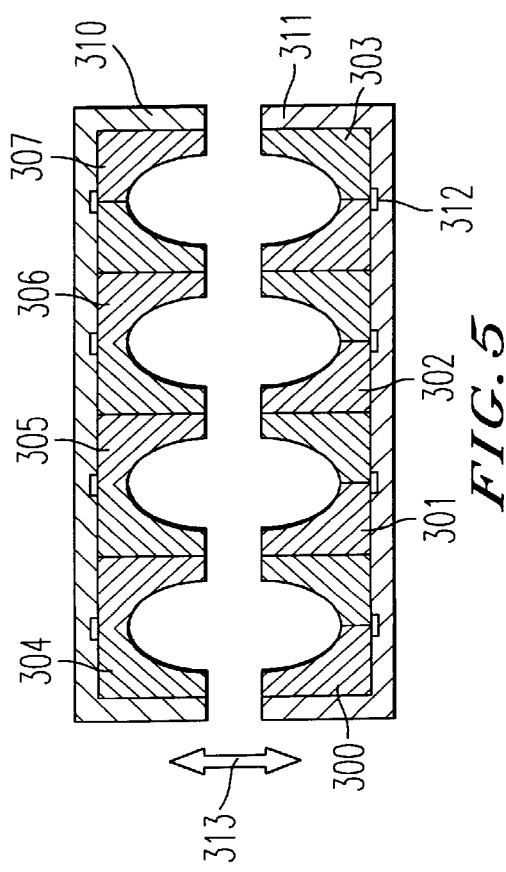

FIGS. 4 and 5 schematically illustrate a mould wherein there are disposed a plurality of cavities 30, 31, 32, 33. Each of the cavities has a shape conforming to that described with reference to FIGS. 1A–1C and 2A–2C and they therefore do not require any additional description. The cavities 30, 31, 32, 33 are disposed in the mould in such a way that their respective pseudo joint planes PJ1, or major axes A, are disposed side by side. The opening joint planes PJ2, or minor axes B, are substantially aligned. The unit is held inside a frame made in two parts 310, 311, each one of the frames enclosing the half-shells 300, 301, 302, 303, and 304, 305, 306, 307 respectively of different cavities 30, 31, 32, 33. The half-frames 310, 311 contain, moreover, circuits for cooling the various cavities. A duct 312 is arranged in the frame opposite each joint plane PJ1 (and possibly PJ2) so as to allow the air coming from the vents to be evacuated.

During the removal from the mould illustrated in FIG. 5 the two half-frames 310, 311 open parallel to the opening plane PJ2, in the direction represented by the arrow 313. Thus, a simultaneous mould removal is obtained from the set of cavities.

In the preceding detailed description, reference has been made to preferred embodiments of the invention. It is obvious that variants may be introduced into them without departing from the spirit of the invention, such as claimed below. In particular, it is possible to apply low pressure inside the ducts 312 so as to promote the evacuation of the air during the blow moulding and to perfect the blow moulding of hollow bodies.

What is claimed as new and desired to be secured by Letters Patent of the United States is:

1. A blow molding mold with a longitudinal axis, comprising:

a first half-shell having a first shell side, and a second half-shell having a second shell side, said half-shells releaseably joinable along a first joint plane so as to form a cavity with an elongate cross-section having a major axis and a minor axis, said first joint plane delimited by said first and second shell sides, said first joint plane being substantially perpendicular to the major axis;

wherein each half-shell comprises at least a first longitudinal part having a first opposed side, a second longitudinal part having a second opposed side, and at least a first joint surface which extends along a longitudinal direction of said mold, and wherein said first and second parts are joined along at said first joint surface;

wherein each joint surface is delimited by two opposed sides of two adjacent longitudinal parts;

wherein at least one of said opposed sides has at least one recess so as to define with the other side at least one slot, said slot configured to allow air to escape during the blow molding of an object.

2. A blow moulding mould according to claim 1, wherein said joint surface is situated substantially on the major axis and perpendicular to the first joint plane so as to allow air to escape along the major axis through said slot.

3. A mould according to claim 1, further comprising a plurality of recesses regularly distributed over the height of the mould, said recesses being obtained alternately on said opposed sides delimiting at least one said joint surface.

4. A mould according to claim 1, further comprising a plurality of recesses regularly distributed over the height of the mould, said recesses being disposed on only one of said opposed sides delimiting at least one said joint surface.

5. A mould according to any one of claims 1 to 4, wherein said two half-shells are joined during the blow moulding on either side of the major axis along said shell sides, at least one of said shell sides having at least one recess so as to define, in each one of the mould ends situated on the minor axis, at least one narrow slot orientated along a longitudinal axis, so as to permit air to escape along the minor axis.

6. A mould according to claims 1, wherein said slots have a height along the longitudinal axis of from 3 mm to 25 mm, and a width of from 0.01 mm to 0.1 mm.

7. A mould according to claim 6, wherein said slots have a height along the longitudinal axis of from 5 mm to 15 mm, and a width of from 0.02 mm to 0.6 mm.

8. A mould according to claim 1, further comprising a plurality of cavities defined by a plurality of first half-shells and a plurality of second half-shells, so as to mould a plurality of objects simultaneously, and said cavities are disposed so that their major axes are disposed side by side and the minor axes are substantially aligned.

9. A mould according to claim 8, wherein a first clamping element is provided to keep said first half-shells of said plurality of cavities joined together, and a second clamping element is provided to keep said second half-shells of said plurality of cavities joined together, so as to permit a simultaneous removal of said plurality of objects from the mould.

10. A mould according to claim 1, further comprising a plurality of recesses regularly distributed over the height of the mould, said recesses being obtained alternately on said opposed sides delimiting at least one said joint surface.

11. A mould according to claim 1, further comprising a plurality of recesses regularly distributed over the height of the mould, said recesses being disposed on only one of said opposed sides delimiting at least one said joint surface.

12. A mould according to claim 1, wherein said two half-shells are joined during the blow moulding on either side of the major axis along said shell sides, at least one of said shell sides having at least one recess so as to define, in each one of the mould ends situated on the minor axis, at least one narrow slot orientated along a longitudinal axis, so as to permit air to escape along the minor axis.

13. A mould according to claim 3, wherein said two half-shells are joined during the blow moulding on either side of the major axis along said shell sides, at least one of said shell sides having at least one recess so as to define, in each one of the mould ends situated on the minor axis, at least one narrow slot orientated along a longitudinal axis, so as to permit air to escape along the minor axis.

14. A mold according to claim 1, wherein said joint surface is arranged such that air may escape from between an object to be blow molded and an inner surface of said mold at least until said object is expanded substantially to a final shape.

15. A mold according to claim 1, wherein said joint surface is arranged such that air may escape from between an object to be blow molded and an inner surface of said mold at least until said object is expanded substantially to an extremity of said oblong cross-section formed at an end of said major axis.

16. A mold according to claim 1, wherein said first joint surface is arranged in the vicinity of said major axis.

17. A mold according to claim 1, wherein said first joint surface is arranged substantially at an end of an extremity of said oblong cross-section.

18. A mold according to claim 1, wherein said first joint surface is arranged at one of said two convex sides.

19. A mold according to claim 1, wherein said joint plane is arranged so as to intersect an inner surface of said cavity at a position which is most remote from said longitudinal axis of said mold.

20. A mold according to claim 1, wherein said joint plane is arranged so as to intersect an inner surface of said cavity at a zone which is most remote from said longitudinal axis of said mold.

21. A mold according to claim 1, wherein said half-shells are moved away from one another along a direction perpendicular to said joint plane during the removal of the object from the mold.

* * * * *